United States Patent [19]

Kondo

[11] 4,251,753
[45] Feb. 17, 1981

[54] POWER SUPPLY CIRCUIT FOR STROBO UNIT

[75] Inventor: Isao Kondo, Hachioji, Japan

[73] Assignee: Olympus Optical Co., Ltd., Tokyo, Japan

[21] Appl. No.: 27,397

[22] Filed: Apr. 5, 1979

[30] Foreign Application Priority Data

Apr. 28, 1978 [JP] Japan .................................. 53/55786

[51] Int. Cl.³ ...................... H05B 41/29; H05B 41/32
[52] U.S. Cl. ............................... 315/219; 315/241 P; 331/112; 363/18
[58] Field of Search ............... 315/219, 241 R, 241 P, 315/278; 331/112; 354/145; 320/1; 363/18

[56] References Cited

U.S. PATENT DOCUMENTS

| | | | |
|---|---|---|---|
| 3,331,034 | 7/1967 | Massoll | 315/241 R X |
| 3,702,961 | 11/1972 | Erickson | 331/112 X |
| 3,958,168 | 5/1976 | Grundberg | 331/112 X |
| 3,969,737 | 7/1976 | Kendrick | 354/141 |
| 4,025,817 | 5/1977 | Wollschleger | 315/241 P |

*Primary Examiner*—Eugene R. La Roche
*Attorney, Agent, or Firm*—Weinstein & Sutton

[57] ABSTRACT

A power supply circuit for strobo unit includes a DC-DC converter which steps up a low voltage from a d.c. source to a higher voltage. The converter comprises an oscillation transformer, a PNP transistor and an NPN transistor, both of which are used to form an oscillation circuit. The circuit arrangement provides a stabilized oscillation and eliminates the likelihood of producing an electric shock.

6 Claims, 4 Drawing Figures

POWER SUPPLY CIRCUIT FOR STROBO UNIT

BACKGROUND OF THE INVENTION

The invention relates to a power supply circuit for strobo unit.

An electronic flash assembly, which is referred to herein as a strobo unit, is frequently used in combination with a photographic camera for taking a picture during the nighttime or in a relatively dark place or for achieving a synchronized photographing during the daytime. It operates in synchronism with a shutter release operation to energize a flash discharge tube contained in the strobo unit to produce a flashlight illumination which is directed to an object being photographed.

A relatively high voltage is required to energize the flash discharge tube for flashlight illumination, but a strobo unit is usually provided as a compact and lightweight construction to enable a portable use thereof together with the camera. A battery which is housed within the strobo unit to be used as a power source is small in size and has a reduced voltage. To produce a high voltage for energizing the flash discharge tube, a DC-DC converter is commonly used to convert the battery voltage to a high voltage on the order of 200 to 300 volts which is supplied to the flash discharge circuit. As is well recognized, such DC-DC converter comprises a transformer including a primary which is connected with an oscillation element to form a self-excited oscillation circuit to produce an a.c. voltage, and also includes a rectifier element which rectifies a high voltage induced across the secondary of the transformer for delivery to the flash discharge circuit. A transistor may be used as the oscillation element, and the transformer is usually provided with a feedback winding to provide a positive feedback to the transistor.

Either PNP or NPN transistor may be used alone in the oscillator. Generally, a PNP transistor comprises a germanium transistor while an NPN transistor comprises a silicon transistor. As compared with silicon transistor, germanium transistor has a reduced forward base-emitter voltage $V_{BE}$ and has a lower maximum rating temperature $T_j$ of the junction. By way of example, $V_{BE}$ is from 0.3 to 0.5 V for germanium while it is from 0.6 to 0.8 V for silicon. The maximum temperature $T_j$ is on the order of 85° C. for germanium and 150° C. for silicon. Thus, it will be seen that an oscillator using a germanium PNP transistor may be satisfactorily operated from a low voltage battery contained in a strobo unit since $V_{BE}$ is low, but requires an extensive heat radiator because of the limited maximum temperature $T_j$. This represents an uneconomical construction, which requires an increased space. An oscillator using a silicon NPN transistor has a higher maximum temperature $T_j$, which enables a heat radiator to be reduced in size, providing an economical advantage and minimizing the space requirement. However, the increased base-emitter voltage $V_{BE}$ results in a limited range of operating voltage as compared with the germanium transistor.

Another consideration involved with such DC-DC converter is the risk of an electric shock which may be caused to the hand of a user by any inadvertent operation inasmuch as the converter produces a voltage output on the order of 200 to 350 volts. In an oscillator circuit employing PNP transistor, such risk can be avoided by a suitable circuit arrangement. However, an oscillator circuit employing NPN transistor is subject to such risk.

This point will be more fully described with reference to FIGS. 1 and 2 which illustrate two exemplary electrical circuits of conventional strobo units. FIG. 1 shows an electrical circuit of a strobo unit employing PNP transistor 3. The strobo unit comprises a flash assembly 10 including a flash discharge tube 13, and a power supply circuit 20 including a low voltage d.c. source 1, formed by dry cells, and a DC-DC converter.

The power supply circuit 20 comprises an oscillation transformer 4 including a primary winding P, a secondary winding 8 and a feedback winding F, a PNP transistor 3, a power switch 2 connected in series with the negative terminal of the source 1, a series circuit including resistor 7 and capacitor 6 which is connected across the combination of the source 1 and switch 2, and a rectifier diode 8 which has its anode connected with one end of the secondary winding S of the transformer.

The flash assembly 10 comprises a main capacitor 9 which is connected between the cathode of diode 8 and the positive terminal of the source 1 and adapted to be charged by a rectified voltage from the diode 8, a series circuit including resistor 17 and a neon lamp 14 which is connected across the main capacitor 9, a series combination of resistor 16 and trigger switch 15, a flash discharge tube 13 connected in shunt with the main capacitor 9, a series circuit connected in shunt with the trigger switch 15 and including a trigger capacitor 1 and the primary winding of a trigger transformer 12, the secondary winding of the trigger transformer 12 being connected with the trigger electrode 13a of the tube 13 for applying a trigger voltage thereto.

In operation, when the power switch 2 is closed, the transistor 3 is supplied with a base current, and the primary winding P of the oscillation transformer is energized by the collector current thereof. An electromagnetic coupling between the primary winding P and the feedback winding F induces a voltage across the feedback winding F which contributes to a further increase in the base current. The net result is a positive feedback action by increasing the collector current of the transistor 3 to cause an oscillation, which is maintained. The combination of resistor 7 and capacitor 6 serves stabilizing the oscillation. As the oscillation is produced by the transistor 3 and the transformer 4, a stepped-up voltage is induced across the secondary winding S, and is rectified by diode 8 to charge the main capacitor 9 and the trigger capacitor 11. As the main capacitor 9 is charged to a level which is sufficient to energize the tube 3, the neon lamp 14 is illuminated, thereby indicating to a user of the camera that a flashlight illumination is available. As the user depresses a shutter button, the trigger switch 15, which represent synchro contacts, is closed, whereby the charge on the trigger capacitor 11 discharges through the primary winding of the trigger transformer 12 to induce a trigger voltage across the secondary winding of the transformer 12. This trigger voltage is applied to the trigger electrode of tube 13 to render it conductive.

As mentioned previously, the main capacitor 9 is charged to a high voltage which is on the order of 200 to 350 volts. A negative bus $E_O$ is connected with the body of the camera which represents the ground, when a strobo unit is mounted on the camera in use. Hence it will be seen that when a user is operating the camera, his body is always in contact with the bus $E_O$. Thus if the user touches directly the positive electrode of the main capacitor 9 which is charged to a high voltage or an associated part which is connected therewith, with his other hand which is free, he may be subject to an electric shock. A camera part which may be directly contacted by a user of the camera is a connection blade with a battery, which in the strobo unit shown in FIG. 1, is a blade for connection with the source 1, usually formed by dry cells. However, with the power supply circuit 20 shown, the use of PNP transistor 3 avoids the likelihood of producing an electric shock. Specifically, the junction between the secondary winding S and the feedback winding F is connected with the base of transistor 3. When the transistor 3 is turned on, the impedance of the base circuit is reduced to a very low value, so that the junction is substantially connected with the ground through the emitter of the transistor 3. Since the transformer 4 provides an isolation between the primary and the secondary thereof, any high voltage produced across the secondary winding S cannot appear at the connection blade with the source 1. Alternatively, when the transistor 3 is turned off, no high voltage is produced across the secondary winding S, presenting no problem. The high voltage to which the main capacitor 9 is charged is prevented by the diode 8 from appearing at the connection blade. For these reasons, there is no likelihood of producing an electric shock in the circuit employing PNP transistor 3.

FIG. 2 shows another conventional circuit employing an NPN transistor. In the strobo unit shown, the flash assembly 10 remains unchanged from that shown in FIG. 1, and the power supply circuit 20 is generally similar to that shown in FIG. 1 except that NPN transistor 23 is substituted for the PNP transistor 3 used in the arrangement of FIG. 1. As a result of this, the connection of the emitter, base and collector of the transistor 23 with the source 1 is changed as is the arrangement of resistor 7 and capacitor 6. In addition, the rectifier diode 8 is poled in the opposite direction. The DC-DC converter shown operates to produce a voltage which is rectified by diode 8 to charge the main capacitor 9. The negative bus $E_O$ of the flash assembly 10 is connected with the negative bus on the part of the camera, which is formed by the body of the camera, when the strobo unit is used.

In the power supply circuit 20 shown in FIG. 2, it is to be noted that a high voltage induced across the secondary winding S of the oscillation transformer 4 can appear directly at the connection blade with the source 1 through the base-emitter path of transistor 23 and through power switch 2. In addition, the high voltage to which the main capacitor 9 is charged can also appear at the connection blade with the source 1 through the bus $E_1$ and power switch 2. Hence, if a user of the camera opens a cover of a battery chamber with the strobo unit mounted on the camera and with the power switch 2 left closed, the connection blade with the source 1 will be exposed which has a high potential difference with respect to the bus $E_O$ connected with the body of the camera. Thus, a user may be subject to an electric shock upon contact with the connection blade.

SUMMARY OF THE INVENTION

It is an object of the invention to provide a power supply circuit for strobo unit which eliminates described disadvantages of the prior art by employing both PNP and NPN transistors.

In accordance with the invention, a PNP transistor is used in a circuit portion involving a reduced current flow and where the voltage across the collector and emitter thereof is low. This avoids a limitation imposed by the maximum rating temperature $T_j$ and allows a satisfactory operation at low voltage levels. The circuit arrangement is such that the likelihood of an electric shock is avoided.

Furthermore, an NPN transistor is used in a circuit portion involving an increased current flow and where the voltage across the collector and emitter is high. The increased maximum rating temperature $T_j$ associated with an NPN transistor provides an increased margin for the operating temperature. Thus, the heat radiator required may be reduced is size, minimizing the space requirement.

DESCRIPTION OF PREFERRED EMBODIMENTS

Figure 3:
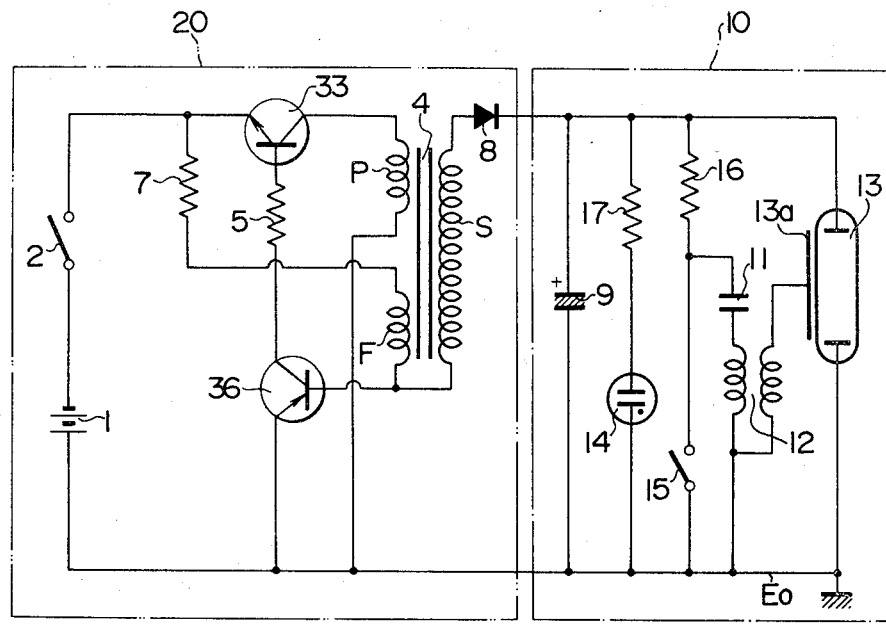
FIG. 3 is a circuit diagram of the power supply circuit according to one embodiment of the invention.

Referring to FIG. 3, there is shown a power supply circuit for strobo unit which is constructed in accordance with the invention. As before, a flash assembly 10 is shown within a block indicated by phantom line, and similarly the power supply circuit 20 is shown in a block also indicated by phantom line. The circuit 20 comprises a d.c. source 1 formed by dry cells or the like, and a DC-DC converter which converts the source voltage to a higher voltage required for the energization of a flash discharge tube 13 contained within the flash assembly 10.

The DC-DC converter comprises an oscillation transformer 4 having primary winding P, secondary winding S and feedback winding F, an NPN silicon transistor 33 having its collector connected with one end of primary winding P, and its emitter connected with the negative terminal of the source 1 through power switch 2, a PNP germanium transistor 36 having its base connected with one end of feedback winding F and its collector connected with the base of NPN transistor 33 through resistor 5, and a resistor 7 connected between the other end of feedback winding F and the power switch 2. The other end of the primary winding P and the emitter of the PNP transistor 36 are connected with the positive bus $E_O$ of the source 1. One end of the secondary winding S is connected with the anode of rectifier diode 8, which supplies a high voltage to the flash assembly 10. The other end of secondary winding S is connected with the base of PNP transistor 36 together with the one end of feedback winding F.

In operation, when the power switch 2 is closed, the PNP transistor 36 has a base current which flows through a path including feedback winding F, resistor 7, power switch 2 and the source 1. The flow of the base current renders transistor 36 conductive, the collector current of which passes through a path including resistor 5, the base-emitter path of NPN transistor 33, power switch 2 and source 1, thus supplying a base current to the transistor 33. When transistor 33 conducts, its collector current flows through the primary winding P, thereby inducing a voltage across feedback winding F which is of a polarity to cause a further increase in the base current of transistor 36. As a consequence, the collector current of transistor 36 increases, increasing the base current to the transistor 33, which in turn increases the collector current of this transistor to a level which is determined by the saturation resistance of transistor 33 and the d.c. resistance of primary winding P. The combination of the resistances prevents a further increase in the collector current of the transistor 33. Thereupon, the induced voltage across the feedback winding F begins to decrease. This in turn causes a decrease in the collector currents, and the both transistors 33, 36 rapidly become cut off by a reverse procedure to that described above. When these transistors are cut off, a back e.m.f is developed across primary winding P and feedback winding F, and charges the distributed capacitance of the respective windings. This produces an oscillating voltage across the feedback winding F, and after one-half period of the oscillating voltage, the base of transistor 36 is forwardly biased to render it conductive, whereupon its collector current begins to flow, returning to the initial condition. This process is repeated to produce a sustained oscillation.

Figure 1:
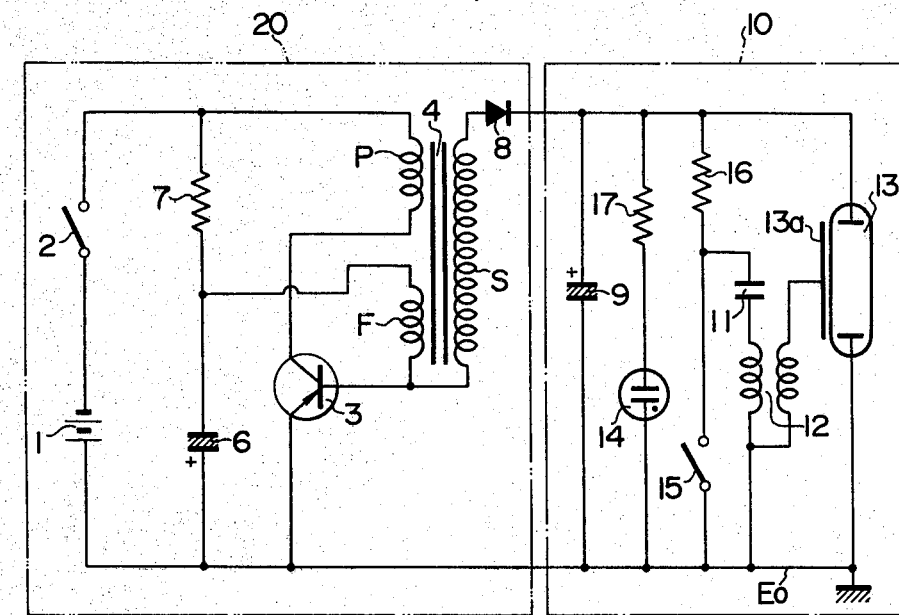
FIGS. 1 and 2 are circuit diagrams of two exemplary power supply circuits of conventional strobo units, the power supply circuit shown in FIG. 1 employing a PNP transistor in the oscillator circuit while the circuit shown in FIG. 2 employing an NPN transistor in the oscillator.
Figure 2:
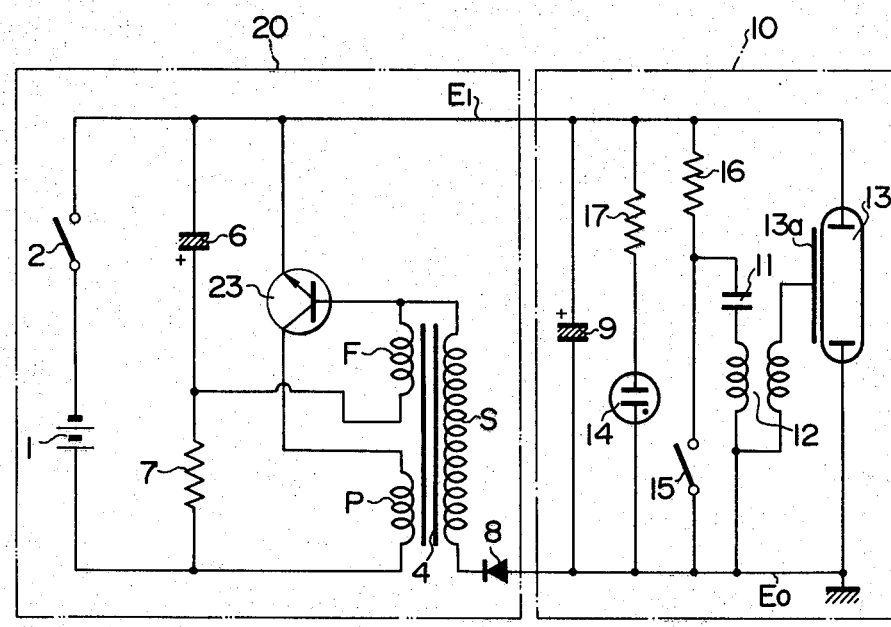

During the oscillation, a stepped-up voltage is induced across the secondary winding S, and is rectified by diode 8 to charge main capacitor 9 and trigger capacitor 11. When the main capacitor is charged to a level which is sufficient to energize the flash discharge tube 13, neon lamp 14 which indicates the completion of the charging operation is illuminated to indicate to a user of the camera that a flashlight illumination is available. The flash assembly 10 operates in the same manner as described above in connection with FIG. 1.

Figure 4:
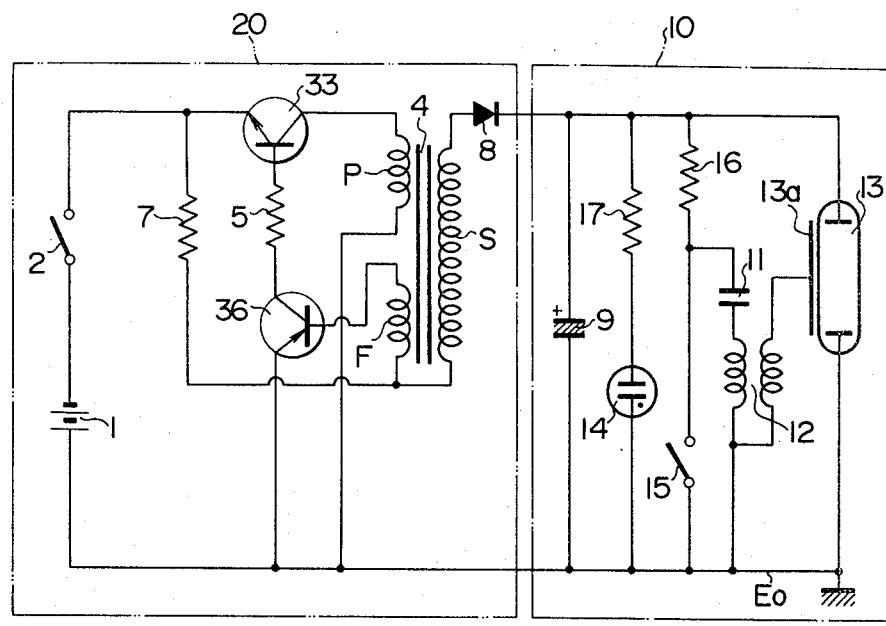
FIG. 4 is a circuit diagram of another embodiment of the invention.

FIG. 4 shows another embodiment of the invention which is similar to the previous embodiment except that the connection of the secondary winding S with the feedback winding F is changed. Because the arrangement and operation are similar as before in other respects, it will not be specifically described.

From the foregoing description, it will be understood that in the power supply circuit 20 of the invention, PNP germanium transistor 36 having a reduced base-emitter voltage $V_{BE}$ is used to facilitate the circuit operation from a low voltage source 1 while NPN silicon transistor 33 is used to provide an increased maximum rating temperature $T_j$, thus allowing the heat radiator to be reduced in size and minimizing the space requirement. The oscillation transformer 4 provides an isolation between its primary and secondary, eliminating the likelihood of producing an electric shock to a user of the camera.

It will be understood that transistor 36 may comprise a silicon transistor of a reduced capacity. Either transistor may be chosen depending on the magnitude of the source battery.

What is claimed is:

1. A power supply circuit for strobo unit comprising a low voltage d.c. source, an oscillation transformer having a primary winding, a step-up secondary winding and a feedback winding, an NPN transistor connected in series across the source and the primary winding of the oscillation transformer, a PNP transistor having its base connected with one end of the feedback winding and its collector connected with the base of the NPN transistor, and a rectifier element for rectifying a high voltage which is induced across the secondary winding to feed a flash discharge circuit.

2. A power supply circuit according to claim 1 in which the NPN transistor has its base connected with the collector of the PNP transistor through a resistor, its collector connected with one end of the primary winding, and its emitter connected with the negative terminal of the source through a power switch.

3. A power supply circuit according to claim 1 in which the PNP transistor has its base connected with one end of the feedback winding, its collector connected with the base of the NPN transistor through a resistor, and its emitter connected with the positive terminal of the d.c. source.

4. A power supply circuit according to claim 1 in which the primary winding has its one end connected with the collector of the NPN transistor and its other end connected with the positive terminal of the d.c source and wherein the secondary winding has its one end connected with the rectifier element and its other end connected with the base of the PNP transistor together with one end of the feedback winding, the other end of the feedback winding being connected with the negative terminal of the d.c. source through a resistor and a power switch.

5. A power source circuit according to claim 1 in which the primary winding has its one end connected with the collector of the NPN transistor and its other end connected with the positive terminal of the d.c source while the secondary winding has its one end connected with the rectifier element and its other end connected with one end of the feedback winding and also connected with the negative terminal of the d.c. source through a resistor and a power switch, the other end of the feedback winding being connected with the base of the PNP transistor.

6. A power supply circuit according to claim 1 in which the rectifier element comprises a diode.

* * * * *

UNITED STATES PATENT AND TRADEMARK OFFICE
CERTIFICATE OF CORRECTION

PATENT NO. : 4,251,753
DATED : February 17, 1981
INVENTOR(S) : Isao Kondo

It is certified that error appears in the above—identified patent and that said Letters Patent is hereby corrected as shown below:

Column 2, line 29, change " 1 " to -- 11 --.

Column 4, line 15, change " is " to -- in --.

Column 6, line 42, change " source " to -- supply --.

Signed and Sealed this

Fifth Day of May 1981

[SEAL]

Attest:

RENE D. TEGTMEYER

Attesting Officer   Acting Commissioner of Patents and Trademarks